(12) United States Patent
Rule et al.

(10) Patent No.: US 10,030,791 B2
(45) Date of Patent: Jul. 24, 2018

(54) ARTICLES AND METHODS OF WRAPPING A SUBSTRATE WITH A POLYMERIC STRUCTURE

(71) Applicant: 3M INNOVATIVE PROPERTIES COMPANY, St. Paul, MN (US)

(72) Inventors: Joseph D. Rule, Woodbury, MN (US); Sharilyn K. Loushin, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 207 days.

(21) Appl. No.: 14/783,592

(22) PCT Filed: Jun. 3, 2014

(86) PCT No.: PCT/US2014/040703
§ 371 (c)(1),
(2) Date: Oct. 9, 2015

(87) PCT Pub. No.: WO2014/197476
PCT Pub. Date: Dec. 11, 2014

(65) Prior Publication Data
US 2016/0076673 A1  Mar. 17, 2016

Related U.S. Application Data

(60) Provisional application No. 61/831,844, filed on Jun. 6, 2013.

(51) Int. Cl.
*B65D 65/02* (2006.01)
*F16L 5/02* (2006.01)
(Continued)

(52) U.S. Cl.
CPC ............... *F16L 5/02* (2013.01); *B29C 65/48* (2013.01); *B29C 66/532* (2013.01); *B29C 66/74* (2013.01);
(Continued)

(58) Field of Classification Search
CPC ............... B29C 61/0616; B65D 59/00; Y10T 428/1372; F16L 58/20
(Continued)

(56) References Cited

U.S. PATENT DOCUMENTS 1,284,569 A   11/1918  Bikowski
3,990,661 A   11/1976  De Groef
(Continued)

FOREIGN PATENT DOCUMENTS

CA   1284569      6/1991
CN   102676073    9/2012
(Continued)

OTHER PUBLICATIONS

International Search Report for PCT International Application No. PCT/US2014/040703, dated Oct. 2, 2014, 3 pgs.

*Primary Examiner* — Ellen S Wood
(74) *Attorney, Agent, or Firm* — Adrian L. Pishko

(57) ABSTRACT

Articles are provided, having a first substrate and a polymeric structure wrapped around the first substrate at least two full circuits. The polymeric structure has a length, a width and a thickness, and comprises a crosslinked polymeric layer uniaxially oriented in the width direction at a draw ratio of at least 1.2:1. The length is greater than the width. A method is also provided including providing a polymeric structure, wrapping the polymeric structure around a first substrate at least two full circuits, positioning the polymeric structure at least partially within an aperture defined by a second substrate, and subjecting the polymeric structure to an elevated temperature above the transition temperature of the crosslinked polymeric layer and below the degradation temperature of each of the components in the polymeric structure. The thickness of the polymeric (Continued)

structure increases, creating at least a partial joint between the first substrate and the second substrate.

19 Claims, 3 Drawing Sheets

(51) Int. Cl.
| | | |
|---|---|---|
| F16L 5/10 | (2006.01) | |
| B29D 99/00 | (2010.01) | |
| B32B 7/12 | (2006.01) | |
| B32B 27/08 | (2006.01) | |
| B29C 65/48 | (2006.01) | |
| B29C 65/00 | (2006.01) | |
| C09J 7/35 | (2018.01) | |
| C09J 7/38 | (2018.01) | |
| C09J 7/29 | (2018.01) | |
| B29K 101/00 | (2006.01) | |
| B29L 31/26 | (2006.01) | |

(52) U.S. Cl.
CPC ............ *B29D 99/0085* (2013.01); *B32B 7/12* (2013.01); *B32B 27/08* (2013.01); *C09J 7/29* (2018.01); *C09J 7/35* (2018.01); *C09J 7/38* (2018.01); *F16L 5/10* (2013.01); *B29K 2101/00* (2013.01); *B29L 2031/26* (2013.01); *B32B 2405/00* (2013.01); *B32B 2581/00* (2013.01); *C09J 2201/134* (2013.01)

(58) Field of Classification Search
USPC .................. 428/34.9, 35.1, 35.2, 35.3, 36.4
See application file for complete search history.

(56) References Cited

U.S. PATENT DOCUMENTS

| | | | |
|---|---|---|---|
| 4,035,534 A | 7/1977 | Nyberg | |
| 4,232,712 A | 11/1980 | Squires | |
| 4,348,438 A | 9/1982 | Canterino | |
| 4,624,720 A | 11/1986 | Pithouse | |
| 4,868,022 A | 9/1989 | Marx | |
| 4,961,797 A | 10/1990 | Doheny | |
| 5,134,000 A * | 7/1992 | Smythe ................... | B29C 61/10 138/104 |
| 5,302,428 A * | 4/1994 | Steele ................. | B29C 61/0616 138/128 |
| 2004/0028862 A1 | 2/2004 | Burwell | |

FOREIGN PATENT DOCUMENTS

| | | |
|---|---|---|
| EP | 0 251 770 | 1/1988 |
| EP | 0286340 | 10/1988 |
| EP | 0307199 | 3/1989 |
| EP | 0328367 | 8/1989 |
| GB | 1 392 212 | 4/1975 |
| JP | 3-169617 | 7/1991 |
| JP | 9-96380 | 4/1997 |
| JP | 2002-103549 | 4/2002 |
| JP | 2005-201042 | 7/2005 |
| JP | 2005-351305 | 12/2005 |
| WO | WO 1989-09128 | 10/1989 |
| WO | WO 2000-78884 | 12/2000 |
| WO | WO 2009/090247 | 7/2009 |

* cited by examiner

ARTICLES AND METHODS OF WRAPPING A SUBSTRATE WITH A POLYMERIC STRUCTURE

CROSS REFERENCE TO RELATED APPLICATIONS

This application is a national stage filing under 35 U.S.C. 371 of PCT/US2014/040703, filed Jun. 3, 2014, which claims priority to U.S. Application No. 61/831,844, filed Jun. 6, 2013, the disclosure of which is incorporated by reference in its/their entirety herein.

FIELD

Articles and methods of wrapping a substrate with a polymeric structure are provided.

BACKGROUND

Grommets are often used to provide a seal between two substrates, e.g., between a pipe and a wall through which the pipe passes. Grommets are potentially difficult to place, as they may be either too tight to move easily along a substrate or, conversely, too loose to provide a water-tight seal between the two substrates. Thus, the use of grommets frequently results in a seal that is not water-tight; leaking of a liquid such as water around a joint between the two substrates can lead to undesirable performance issues and aesthetic problems, for instance visible rusting of a metal substrate. Additional sealing such as a one-part polyurethane sealant applied around the grommets has been one method of providing a water-tight seal, however, this is labor intensive, unsightly, and sometimes still allows liquid to leak around the joint between the two substrates.

SUMMARY

Articles are provided having a polymeric structure including a crosslinked polymeric layer oriented in a width direction. In a first aspect, an article is provided that includes a polymeric structure having a length, a width, and a thickness, wherein the length of the polymeric structure is greater than the width of the polymeric structure. The polymeric structure includes a crosslinked polymeric layer uniaxially oriented in the width direction at a draw ratio of at least 1.2:1, a first adhesive layer adjacent to a first major surface of the crosslinked polymeric layer, and a second adhesive layer adjacent to a second major surface of the crosslinked polymeric layer.

In a second aspect, an article is provided including a first substrate and a polymeric structure wrapped around the first substrate at least two full circuits. The polymeric structure has a length, a width and a thickness, and comprises a crosslinked polymeric layer uniaxially oriented in the width direction at a draw ratio of at least 1.2:1. The length of the polymeric structure is greater than the width of the polymeric structure.

In a third aspect, a method of making an article is provided. The method includes providing a polymeric structure having a length, a width and a thickness, wherein the length of the polymeric structure is greater than the width of the polymeric structure. The polymeric structure comprises a crosslinked polymeric layer uniaxially oriented in the width direction at a draw ratio of at least 1.2:1. The method also includes wrapping the polymeric structure around a first substrate at least two full circuits, positioning the polymeric structure at least partially into an aperture defined by a second substrate, and subjecting the polymeric structure to an elevated temperature above the transition temperature of the crosslinked polymeric layer and below the degradation temperature of the crosslinked polymeric layer and any other components present in the polymeric structure. The thickness of the polymeric structure is thereby increased, creating at least a partial joint between the first substrate and the second substrate.

Figure 1:
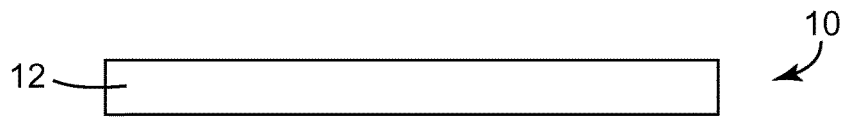
FIG. 1 is an exemplary schematic of a polymeric structure including a single layer.

While the above-identified drawings, which may not be drawn to scale, set forth various embodiments of the present disclosure, other embodiments are also contemplated, as noted in the Detailed Description.

DETAILED DESCRIPTION

Articles and methods of wrapping a substrate with a polymeric structure are provided. More specifically, the polymeric structure has a length, a width and a thickness, and comprises a crosslinked polymeric layer uniaxially oriented in the width direction at a draw ratio of at least 1.2:1. The length of the polymeric structure is greater than the width of the polymeric structure. The articles can provide a grommet-like seal between two substrates.

The recitation of any numerical range by endpoints is meant to include the endpoints of the range, all numbers within the range, and any narrower range within the stated range (e.g. 1 to 5 includes 1, 1.5, 2, 2.75, 3, 3.8, 4, and 5). Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that, as used herein:

The term "a", "an", and "the" are used interchangeably with "at least one" to mean one or more of the elements being described.

The term "and/or" means either or both. For example, the expression "A and/or B" means A, B, or a combination of A and B.

The term "adjacent" refers to one element being in close proximity to another element and includes the elements touching one another and further includes the elements being separated by one or more layers disposed between the elements. In many embodiments, the elements are polymeric layers and substrates.

The term "polymeric structure" refers to an element that comprises at least one polymer.

The term "crosslinked polymeric" layer refers to a layer of a polymer in which at least a portion of the polymer chains are chemically bound or physically bound to adjacent polymer chains.

The term "primer layer" refers to a layer configured to assist in adhering two layers together; in particular, the primer layer is disposed between and directly adjacent to each of the two layers.

The term "uniaxially oriented" refers to a polymeric layer that has been stretched in a single direction, for instance stretched in the length (e.g., machine) direction, or stretched in the width (e.g., transverse) direction. A uniaxially oriented polymeric layer is capable of being shrunk when exposed to heat above the transition temperature of the oriented polymer(s), and below the degradation temperature of the oriented polymer(s) as well as preferably below the degradation temperature of all of the components present in the polymeric layer.

The term "draw ratio" refers to the extent of stretching of a layer, in which the first number of the ratio is the measured distance of an axis of the layer following stretching and the second number of the ratio is the measured distance of an axis of the layer prior to stretching. For example, a draw ratio of 1.2:1 refers to a layer that has been stretched to have a length 20% greater than its initial, unstretched, length.

In a first aspect, an article is provided. More particularly, an article is provided comprising a polymeric structure having a length, a width, and a thickness, wherein the length of the polymeric structure is greater than the width of the polymeric structure. The polymeric structure includes a crosslinked polymeric layer uniaxially oriented in the width direction at a draw ratio of at least 1.2:1. The polymeric structure can be wrapped around a first substrate, for example where the first substrate penetrates or passes through a second substrate. When heated, the polymeric structure shrinks in the width direction and expands in thickness (i.e., the direction normal to each of the width and length). Optionally, the polymeric structure further comprises a first adhesive layer adjacent to a first major surface of the crosslinked polymeric layer, a second adhesive layer adjacent to a second major surface of the crosslinked polymeric layer, or both.

In a second aspect, an article is provided including a first substrate and a polymeric structure wrapped around the first substrate at least two full circuits. The polymeric structure has a length, a width and a thickness, and comprises a crosslinked polymeric layer uniaxially oriented in the width direction at a draw ratio of at least 1.2:1. The length of the polymeric structure is greater than the width of the polymeric structure.

In a third aspect a method is provided. More specifically, the method comprises providing a polymeric structure having a length, a width and a thickness, wherein the length of the polymeric structure is greater than the width of the polymeric structure. The polymeric structure comprises a crosslinked polymeric layer uniaxially oriented in the width direction at a draw ratio of at least 1.2:1. The method also comprises wrapping the polymeric structure around a first substrate at least two full circuits and positioning the polymeric structure at least partially into an aperture defined by a second substrate. The method further comprises subjecting the (coiled) polymeric structure to an elevated temperature above the transition temperature of the crosslinked polymeric layer and below the degradation temperature of the crosslinked polymeric layer and any other components present in the polymeric structure. The thickness of the polymeric structure is thereby increased, creating at least a partial joint between the first substrate and the second substrate. In many embodiments, the positioning comprises sliding the polymeric structure a distance of at least a quarter of the width of the polymeric structure into the aperture defined by the second substrate, prior to subjection to an elevated temperature.

The following description of embodiments of the present disclosure relates to any one or more of the above three aspects.

The polymeric structure includes a crosslinked polymeric layer comprising a polymer that is both readily crosslinked and oriented. On the molecular level, crosslinked polymers include polymer networks comprising segment chains that are connected by netpoints. The netpoints can be formed by covalent bonds, entanglements of the polymer chains, or intermolecular interactions of certain polymer blocks or functional groups of the polymer. Crosslinked polymers have a defined melting point ($T_m$) or glass transition temperature ($T_g$). Therefore, crosslinked polymers can be glassy or crystalline and can be either thermosets or thermoplastics. Thermoplastic crosslinked polymers are suitable for use in the polymeric structure. Hereinafter, the melting point ($T_m$) or glass transition temperature ($T_g$) will be referred to as the transition temperature or $T_{trans}$. Certain crosslinked polymers have an advantage of capacity for high strain: often to several hundred percent.

In some cases, the physical netpoints of a crosslinked polymer can be formed reversibly. These netpoints include intermolecular interactions and chain entanglements. Crosslinked polymers with reversibly formable netpoints often have a temperature, $T_{perm}$, at which the netpoints are eliminated. $T_{perm}$ is higher than $T_{trans}$ and represents a temperature at which the polymer becomes capable of melt flow. Crosslinked polymers with covalent bonds as netpoints are generally incapable of melt flow at any temperature, and generally do not have a $T_{perm}$.

The permanent shape of a crosslinked polymer is established when the netpoints or crosslinks are formed in an initial casting or molding process. If the polymer is chemically crosslinked, these chemical crosslinks can be formed as the polymer is initially cured, often by including a multifunctional monomer in the polymerization mixture. Alternatively, the chemical crosslinks can be formed after the initial polymerization, for example by radiation such as UV light or E-beam. If the polymer is physically crosslinked and has a $T_{perm}$, the netpoints are usually formed by heating the polymer above the $T_{perm}$, forming the polymer into the desired permanent shape, and then allowing it to cool below $T_{perm}$, allowing the physical netpoints to form.

A crosslinked polymer can be deformed from the permanent shape to a temporary, deformed shape. This step is often done by heating the polymer above its $T_{trans}$ and below its $T_{perm}$, if present; deforming the sample; and then holding the deformation in place while the polymer cools. This is typically performed during orientation of a polymer. Alternatively, in some instances the polymer can be deformed at a temperature below its $T_{trans}$ and maintain that temporary shape. Subsequently, the original shape is recovered by heating the material above the $T_{trans}$.

Examples of suitable physically crosslinked polymers include, but are not limited to, linear block copolymers, such as thermoplastic polyurethane elastomers. Multiblock copolymers can also serve as SMPs, such as copolymers of polyurethanes, polystyrene and poly(1,4-butadiene), ABA triblock copolymers of poly(tetrahydrofuran) and poly(2-methyl-2-oxazoline), polyhedral oligomeric silsesquioxane (POSS)-modified polynorbornene, and PE/Nylon-6 grafted copolymer.

Additional examples of crosslinked polymers include polyurethanes, polyolefins, polyvinylchlorides, ethylenevinylacetate polymers, polynorbornenes, polyethers, polyacrylates, polyamides, polyether amides, polyether esters, polymethylmethacrylates, crosslinked polyethylenes, crosslinked polycyclooctenes, inorganic-organic hybrid polymers, copolymer blends with polyethylene and styrene-butadiene co-polymers, urethane-butadiene co-polymers, PMMA, polycaprolactone or oligo caprolactone copolymers, PLLA or PL/D LA co-polymers, PLLA PGA co-polymers, and photocrosslinkable polymers including azo-dyes, zwitterionic, and other photochromatic materials such as those described in "Shape Memory Materials" by Otsuka and Wayman, Cambridge University Press 1998. Examples of suitable chemically crosslinked shape-memory polymers include, but are not limited to, HDPE, LDPE, copolymer of PE and polyvinyl acetate. Commercially available thermoplastic crosslinked polymers include, but are not limited to, polyurethanes available under the trade name "DiARY" including the MM type, MP type, MS type and MB (microbead powder) type series from SMP Technologies; elastic memory composite ("EMC") from Composite Technology Development, Inc.; and those available under the trade name "VERIFLEX" from Cornerstone Research Group ("CRG").

FIG. 1 provides an exemplary schematic of a polymeric structure 10 according to certain embodiments of the disclosure. The polymeric structure 10 includes a crosslinked polymeric layer 12. A polymeric structure, in certain embodiments, is also referred to as a "tape", due to having a length greater than its width.

Regarding the extent of uniaxial orientation, typically the crosslinked polymeric layer is oriented in the width direction at a draw ratio of at least 1.2:1, at least 1.3:1, at least 1.5:1, at least 1.7:1, at least 1.8:1, at least 2:1, at least 2.4:1, at least 2.8:1, at least to 3:1, or at least 3.5:1. In certain embodiments, the crosslinked polymeric layer is oriented in the width direction at a draw ratio of no more than 4:1, no more than 4.5:1, no more than 3:1, no more than 2.5:1, or no more than 2:1. In certain embodiments, the crosslinked polymeric layer is oriented in the width direction at a draw ratio of 1.2:1 to 4:1, or 1.2:1 to 3:1, or 1.2:1 to 2:1, or 1.5:1 to 3:1. The orientation imparts shrinkability to the polymeric structure, and accordingly films of oriented polymers are often referred to as "shrink films." The uniaxial orientation is performed using conventional methods known in the art, for example with a tenter apparatus, or a blown film apparatus.

In certain embodiments, a suitable thickness of the oriented crosslinked polymeric layer ranges from 25 micrometers (μm) to 1000 μm, or from 25 μm to 700 μm, or from 25 μm to 500 μm, or from 25 μm to 250 μm, or from 200 μm to 1000 μm, or from 200 μm to 500 μm. In certain embodiments, the polymeric structure further comprises a first adhesive layer, a second adhesive layer, or both a first adhesive layer and a second adhesive layer. At least one of the first adhesive layer and the second adhesive layer typically comprises an elastomeric material that has a modulus between 0.1 megaPascals (MPa) and 2000 MPa at 23 degrees Celsius. Each of the first adhesive layer and the second adhesive layer preferably comprises a material independently selected from polyisobutylene, a block copolymer, a styrene-butadiene copolymer, an ethylenevinylacetate polymer, a polycyclooctene, an acrylic polymer, a synthetic rubber, a silicone polymer, a polyamide, a polyurethane, and a combination thereof. One example of a suitable acrylic polymer is one prepared from a monomer mixture containing isooctylacrylate and acrylic acid. In an embodiment, the first adhesive layer comprises a hot melt adhesive. In an embodiment, the second adhesive layer includes a pressure sensitive adhesive. In certain embodiments a tackifier is included one or more adhesive layers. Suitable tackifiers include for example and without limitation hydrogenated hydrocarbon tackifiers.

In some embodiments, the polymeric structure comprises a plurality of adhesive layers, including a third adhesive layer, a fourth adhesive layer, a fifth adhesive layer, or more. Each additional adhesive layer is located adjacent to the crosslinked polymeric layer, another adhesive layer, or both. In some embodiments, a plurality of adhesive layers is provided in the polymeric structure in a stack of two or more adhesive layers disposed directly adjacent to each other.

In certain embodiments, a pressure sensitive adhesive is employed as an exterior layer of the polymeric structure, which provides the advantage of assisting to hold the polymeric structure in a coiled configuration following wrapping of the polymeric structure around a first substrate. In particular, the tacky pressure sensitive adhesive helps to secure each coil to the next adjacent coil when the polymeric structure is wrapped around the first substrate, yet in its location as an exterior layer does not contact the surface of the first substrate.

In certain embodiments, a suitable thickness for each adhesive layer present independently ranges from 12 micrometers (μm) to 1000 μm, or from 12 μm to 700 μm, or from 12 μm to 500 μm, or from 12 μm to 250 μm, or from 200 μm to 1000 μm, or from 200 μm to 500 μm.

Figure 3:
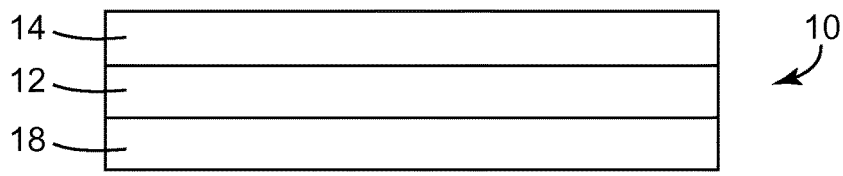
FIG. 3 is an exemplary schematic of another polymeric structure including three layers.

FIG. 3 provides an exemplary schematic of a polymeric structure 10 comprising two adhesive layers, according to certain embodiments of the disclosure. The polymeric structure 10 includes a crosslinked polymeric layer 12, a first adhesive layer 14 disposed adjacent to a major surface of the crosslinked polymeric layer 12, and a second adhesive layer 18 disposed adjacent to an opposite major surface of the crosslinked polymeric layer 12. In an embodiment, the first adhesive layer 14 comprises a hot melt adhesive, and the second adhesive layer 18 comprises a pressure sensitive adhesive. In certain embodiments including at least one adhesive layer, a lubricant (e.g., an alcohol such as isopropanol) is applied to the polymeric structure surface, the first substrate surface, or both, to lubricate the interface between the substrate and the adhesive to more easily slide the polymeric structure along the first substrate. The lubricant is preferably volatile, and is evaporated off of the polymeric structure and substrate prior to heating.

The polymeric structure further optionally comprises a primer layer disposed between the first major surface of the crosslinked polymeric layer and the first adhesive layer, between the second major surface of the crosslinked polymeric layer and the second adhesive layer, or both. One or more primer layers are employed to enhance adhesion between the crosslinked polymeric layer and the first adhesive layer and/or the second adhesive layer. A primer layer is typically applied to the substrate as a coating composition using conventional techniques such as, for example, bar coating, roll coating, curtain coating, rotogravure coating, knife coating, spray coating, spin coating, dip coating, or slide coating techniques. Coating techniques such as bar coating, roll coating, and knife coating are often used to adjust the thickness of the primer layer coating composition.

In certain embodiments, a suitable thickness for each optional primer layer present independently ranges from 25 nanometers (nm) to 1000 nm, or from 25 nm to 700 nm, or from 25 nm to 500 nm, or from 25 nm to 250 nm, or from 200 nm to 1000 nm, or from 200 nm to 500 nm.

The surface of the crosslinked polymeric layer can optionally be treated to improve adhesion of other layers to the crosslinked polymer, using, e.g., plasma treatment, flame treatment, or corona treatment such as air or nitrogen corona. A surface treatment is used either in lieu of or in addition to one or more primer layers.

Figure 2:
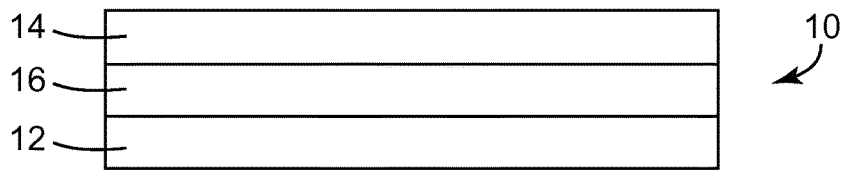
FIG. 2 is an exemplary schematic of a polymeric structure including three layers.

FIG. 2 provides an exemplary schematic of a polymeric structure 10 comprising one adhesive layer and one primer layer, according to certain embodiments of the disclosure. The polymeric structure 10 includes a crosslinked polymeric layer 12, a first adhesive layer 14 disposed adjacent to a major surface of the crosslinked polymeric layer 12, and a first primer layer 16 disposed between the crosslinked polymeric layer 12 and the first adhesive layer 14. The first primer layer 16 is located directly adjacent to the major surface of the crosslinked polymeric layer 12.

Figure 4:
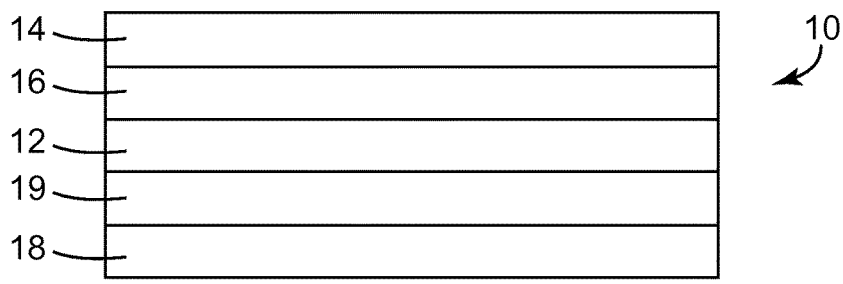
FIG. 4 is an exemplary schematic of a polymeric structure including five layers.

FIG. 4 provides an exemplary schematic of a polymeric structure 10 comprising two adhesive layers and two primer layers, according to certain embodiments of the disclosure. The polymeric structure 10 includes a crosslinked polymeric layer 12, a first adhesive layer 14 disposed adjacent to a first major surface of the crosslinked polymeric layer 12, and a first primer layer 16 disposed between the crosslinked polymeric layer 12 and the first adhesive layer 14. The first primer layer 16 is located directly adjacent to the first major surface of the crosslinked polymeric layer 12. The polymeric structure 10 further includes a second adhesive layer 18 disposed adjacent to a second major surface of the crosslinked polymeric layer 12, and a second primer layer 19 disposed between the crosslinked polymeric layer 12 and the second adhesive layer 18. The second primer layer 19 is located directly adjacent to the second major surface of the crosslinked polymeric layer 12.

At least one additive is optionally included in the polymeric structure in certain embodiments. For example, the at least one additive is typically selected from the group consisting of flame retardants, inorganic fillers, magnetic susceptors, and antioxidants. Such additives include materials conventionally used in the art as of flame retardants, inorganic fillers, magnetic susceptors, and antioxidants. The additives are included in any one or more of the individual polymeric layer(s) present in the polymeric structure.

Advantageously, when the polymeric structure is wrapped around the first substrate, positioned (e.g., slid) at least partially into an aperture defined by a second substrate, and then exposed to heat, the expansion of the thickness of the polymeric structure can form at least a partial joint between the first and second substrates. Alternatively, the aperture is instead defined cooperatively by the second substrate and a third substrate. One example of such a configuration would be a clamshell in which the second substrate provides a first half of the clamshell and the third substrate provides the second half of the clamshell, with an aperture formed at the intersection of the second and third substrates. In certain embodiments, the polymeric structure acts to form a grommet-like mechanical seal between the first substrate and the second substrate. One advantage of being able to form a joint or seal between two or more substrates using a polymeric structure that is wrapped around a first substrate is that it is capable of being employed any time after the two substrates have been installed; for instance, when the first substrate has no free end over which to slide a grommet or other sealing element.

To provide expansion in the thickness direction, the crosslinked polymeric layer shrinks in the width direction by more than 10% upon subjection to temperature above the transition temperature of the crosslinked polymeric layer and below the degradation temperature of each component in the polymeric structure. More specifically, each component includes for example and without limitation, the crosslinked polymeric layer, a first adhesive layer, a second adhesive layer, optional one or more primer layers, other optional layers, and any optional additives. Preferably, the crosslinked polymeric layer shrinks in the width direction by at least 20%, at least 30%, at least 40%, or at least 50%, upon subjection to temperature above the transition temperature of the crosslinked polymeric layer and below the degradation temperature of each component in the polymeric structure. In certain embodiments, the crosslinked polymeric layer shrinks in the width direction by between 10% and 80% when subjected to the elevated temperature, or between 10% and 70%, or between 10% and 60%, or between 10% and 50%, or between 15% and 60%, or between 20 and 50%, when subjected to the elevated temperature.

Preferably, the crosslinked polymeric layer exhibits little to no shrinking in the length direction upon subjection to temperature above the transition temperature of the crosslinked polymeric layer and below the degradation temperature of each component in the polymeric structure. Providing orientation (and thus subsequent heat shrinking) in the length direction is disadvantageous for several reasons. For instance, a polymer has a finite total extent of orientation, thus orienting in the length direction decreases the extent to which the crosslinked polymeric layer can be oriented in the width direction, essentially wasting orientation capability. Moreover, upon exposure to heat, any orientation in the length direction that is unable to be relaxed due to resistance within one or more of the layers in the polymeric structure, leaves stresses remaining within the polymeric structure that can cause undesirable effects over time, such as creep or partial to complete failure of the polymeric structure's structural integrity. The crosslinked polymeric layer preferably decreases (i.e., shrinks) in the length direction by less than 10% upon subjection to a temperature above the transition temperature of the crosslinked polymeric layer and below the degradation temperature of each component in the polymeric structure, e.g., of each of the crosslinked polymeric layer, the first adhesive layer, and the second adhesive layer. In certain embodiments, the crosslinked polymeric layer decreases in the length direction by less than 8%, or less than 6%, or less than 4%, or between 0% and 9%, or between 1% and 9%, or between 1% and 8%, or between 2% and 8%, upon subjection to a temperature above the transition temperature of the crosslinked polymeric layer and below the degradation temperature of each component in the polymeric structure. In certain embodiments, the length of the crosslinked polymeric layer actually increases, such as by as much as 15%.

Typically, the first substrate includes a pipe, a cable, a tube, a rod, a wire, or a bundle of one or more of combinations thereof. The second substrate includes for example and without limitation, plastic, wood, metal, glass, ceramic, concrete, composite material, or a combination thereof.

Figure 5A:
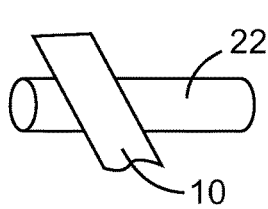
FIG. 5(a) is a partial perspective view of a polymeric structure and a substrate, according to an embodiment.
Figure 5B:
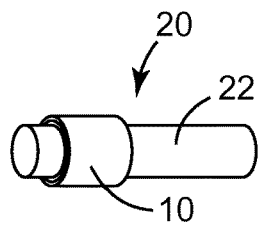
FIG. 5(b) is a partial perspective view of an article including the polymeric structure of FIG. 5(a) wrapped around the substrate of FIG. 5(a).
Figure 5C:
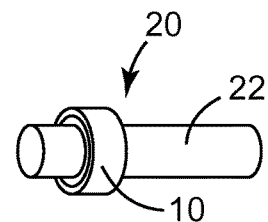
FIG. 5(c) is a partial perspective view of the article of FIG. 5(b) following subjection of the polymeric structure to elevated temperature.

FIG. 5 provides partial perspective views illustrating steps to form an article 20 including a substrate and a polymeric structure wrapped around the substrate. FIG. 5(a) includes a polymeric structure 10 and a substrate 22 having a shape like a pipe. FIG. 5(b) includes an article 20 in which the polymeric structure 10 is wrapped around the substrate 22 more than two full circuits (e.g., the polymeric structure 10 is coiled). Last, FIG. 5(c) illustrates an optional step in forming the article 20, in which the wrapped polymeric structure 10 has been subjected to elevated temperature above the transition temperature of the crosslinked polymeric layer and below the degradation temperature of each component in the polymeric structure, whereby the polymeric structure 10 has shrunk in the width direction (e.g., parallel to the length of the substrate 22) and increased in thickness.

When an article is positioned at least partially within an aperture defined by a second substrate (or combination of a second substrate and a third substrate) and the polymeric structure is subjected to an elevated temperature above the transition temperature of the crosslinked polymeric layer and below the degradation temperature of the crosslinked polymeric layer and any other components present in the polymeric structure, the thickness of the polymeric structure increases, and at least a partial joint is created between the first substrate and the second substrate. In many embodiments, the second substrate comprises plastic, wood, metal, glass, ceramic, concrete, composite material, or a combination thereof. The second substrate is often a portion of a wall, equipment housing, or the like, and defines an aperture through which the first substrate passes.

When the polymeric structure is wrapped around a substrate at least two full circuits, a first length of the polymeric structure is wrapped around the substrate and a second length of the same continuous polymeric structure is wrapped around the first length. The first and second lengths of the polymeric structure together provide a total thickness of the wrapped polymeric structure around the substrate. The continuity of the total thickness of a polymeric structure wrapped around a substrate could be disrupted by either a significant change in the length of the first and second lengths of the polymeric structure or by a partial uncoiling of the polymeric structure, thereby introducing one or more gaps into the total thickness of the wrapped polymeric structure. The low capability of the crosslinked polymer to shrink in the length direction upon subjection to an elevated temperature minimizes any disruption to the continuity of the coiled polymeric structure wrapped around a first substrate at least two full circuits. This is beneficial at least because otherwise, changes to the continuity (e.g., during heating) could result in such gaps forming between one or more of the individual coils in the total wrap, between the polymeric structure and the first substrate, or between the polymeric structure and a second substrate, thereby allowing fluids, gases, and the like to be able to pass through the joint formed by the polymeric structure between the first substrate and the second substrate.

A benefit of providing at least two full circuits of the polymeric structure wrapped around the substrate includes supplying a smaller step change in thickness of the wrapped substrate between the end of the polymeric structure to the circuit directly below the end. The greater the number of full circuits of polymeric structure wrapped around a substrate, the smaller the step change in thickness will be relative to the total thickness of the wrapped polymeric structure; the percent change can be calculated as 1/(number of full circuits)×100 For instance, the percent change in polymeric structure thickness for a wrapped substrate having just one full circuit is 100%, while the percent change in polymeric structure thickness for a wrapped substrate having two full circuits is 50%, for three full circuits is 33.3%, and for four full circuits is 25%. Decreasing the step change in thickness is advantageous with respect to minimizing the potential for leakage between the wrapped substrate and the aperture of a substrate through which the wrapped substrate passes due to providing a more symmetrical outer surface and inner surface to the wrapped substrate than one having a larger step change in thickness.

An advantage of embodiments of the polymeric structure includes the ability to employ one thickness of polymeric structure with many different combinations of first and second substrates because the gap between the outer diameter of the first substrate and the inner diameter of the second substrate can typically be filled by a coil of the polymeric structure by selecting an appropriate number of full circuits of the polymeric structure to wrap around the first substrate. In contrast, one would need to have a specifically sized grommet for each different combination of first and second substrates. Accordingly, a polymeric structure having a smaller thickness would be more versatile than the same polymeric structure having a larger thickness because it would provide more tunability in the final coil thickness using multiple full circuits of the polymeric structure wrapped around the substrate.

Depending on the particular applications, varying amounts of sealing of the joint between the first substrate and the second substrate are required. For instance, if the first substrate is a metal pipe and the second substrate is an exterior building wall, it would be desirable to provide a completely liquid-tight seal between the two substrates to minimize the ability of weather conditions or pests to enter the building at the joint between the two substrates. Similarly, if the first substrate is a bundle of wires and the second substrate is a housing for electronic equipment, it would be desirable to provide a mostly or completely liquid-tight seal between the two substrates to minimize any liquid damage to the electronic equipment within the housing. In certain embodiments, the polymeric structure contacts the second substrate such that water applied to the joint between the first substrate and the second substrate at a pressure of 6000 Pascals (Pa) passes between the polymeric structure and the second substrate at a rate of 6 milliliters per second (mL/s) or less, or 4 mL/s or less, or 2 mL/s or less, or 1 mL/s or less, or between 0 mL/s and 6 mL/s, or between 0 mL/s and 4 mL/s, or between 0 mL/s and 2 mL/s, or between 1 mL/s and 4 mL/s. In some embodiments, the polymeric structure contacts the second substrate such that when water is applied to the joint between the first substrate and the second substrate at a pressure of 6000 Pascals (Pa) for 24 hours no measurable amount of water passes between the polymeric structure and the second substrate.

The extent of liquid-tight seal provided by a polymeric structure can also be described as a function of the area of the aperture present between the exterior diameter of the first substrate and the interior diameter of the second substrate's aperture, thus the leak rate can be calculated as milliliters per second per square centimeter (mL·s$^{-1}$·cm$^{-2}$). Such units take into account the fact that a specific leak rate for a small gap between the first substrate and interior diameter of the aperture defined by the second substrate might be unacceptable, whereas the same leak rate for a larger gap might be acceptable. In certain embodiments, the polymeric structure contacts the second substrate such that water applied to the joint between the first substrate and the second substrate at a pressure of 6000 Pascals (Pa) passes between the polymeric structure and the second substrate at a rate of 10 milliliters per second per square centimeter (mL·s$^{-1}$·cm$^{-2}$) or less, or 8 mL·s$^{-1}$·cm$^{-2}$ or less, or 6 mL·s$^{-1}$·cm$^{-2}$ or less, or 3 mL·s$^{-1}$·cm$^{-2}$ or less.

An advantage of the polymeric structures disclosed herein is that, unlike typical grommets, they are suitable for use with a substrate that does not have an available end. This is due to their capability of being wrapped around the substrate rather than slid over an end of the substrate. For instance, a substrate that does not have an available end potentially includes any substrate that is part of a closed loop of one or more substrates (e.g., connected piping), or any substrate having a free end that is located in an area not readily accessible to a user (e.g., within a sealed wall). Accordingly, in some embodiments the first substrate comprises no accessible end.

In certain embodiments, when forming an article including a polymeric structure and a first substrate, the polymeric structure is wrapped around the first substrate and then positioned at least partially into an aperture defined by a second substrate. The distance the polymeric structure is moved (e.g., slid) is at least a quarter of the width of the polymeric structure, or at least a third of the width, or at least half of the width, or at least two thirds of the width, or at least three quarters of the width, or at least the total width, or at least one and a half times the width of the polymeric structure. In many cases the wrapped polymeric structure is thus moved a distance of between a quarter of its width and one and a half times its width to be positioned to be capable of forming at least a partial joint between the first substrate and the second substrate upon subjection to elevated temperature. To minimize the distance that the polymeric structure would need to be moved to be able to form at least a partial joint, it is usually desirable to wrap the polymeric structure around the first substrate as close as practically possible to the location of the second substrate.

When the thickness of the polymeric structure is increased upon subjection to an elevated temperature, the outer diameter of the polymeric structure is preferably at least as large as the inner diameter of the aperture in the second substrate, or larger than the inner diameter of the aperture in the second substrate. Moreover, in certain embodiments the polymeric structure adheres to the second substrate when at least a partial joint is formed between the first substrate and the second substrate. For instance, in embodiments wherein the polymeric structure comprises a hot melt adhesive disposed adjacent to a major surface of the crosslinked polymer that comes into contact with the inner diameter of the aperture in the second substrate, the subjection to an elevated temperature results in adhering the polymeric structure to the second substrate. Such a hot melt adhesive is often non-tacky at room temperature, but becomes tacky when heated. Similarly, in certain embodiments the polymeric structure adheres to the first substrate when subjected to an elevated temperature, for instance when a hot melt adhesive is present in direct contact with the first substrate. At least partially adhering the polymeric structure to the first substrate improves the leak resistance of the joint formed between the first substrate and the second substrate.

The type of heat to which the polymeric structure is subjected to is not particularly limited. For example, subjecting the polymeric structure to an elevated temperature typically comprises heating the polymeric structure with hot air, resistive heat, inductive heat, conductive heat, IR light, steam, flame, or combinations thereof. More specifically, in many embodiments subjecting the polymeric structure to an elevated temperature comprises heating the polymeric structure with a lamp, a torch, a heat gun, or combinations thereof. The polymeric structure is subjected to an elevated temperature above the transition temperature of the crosslinked polymeric layer and below the degradation temperature of the crosslinked polymeric layer and any other components present in the polymeric structure, which in certain embodiments includes heating the polymeric structure to a temperature of 60 degrees Celsius (° C.) to 150° C., or 60° C. to 120° C., or 80° C. to 120° C.

FIG. 6 provides partial perspective views illustrating a method for forming an article 20 including a substrate and a polymeric structure wrapped around the substrate, as well as a second article 30 including a polymeric structure wrapped around a first substrate. The polymeric structure in the second article 30 forms at least a partial joint between the first substrate and a second substrate. FIG. 6(a) includes a polymeric structure 10 and a first substrate 22 having a shape similar to a pipe. The first substrate 22 is disposed through an aperture 26 defined by a second substrate 24. The method comprises wrapping the polymeric structure 10 around the first substrate 22 at least two full circuits, wherein the polymeric structure is positioned at a predetermined distance from the aperture 26 defined by the second substrate 24. FIG. 6(b) illustrates an article 20 in which the polymeric structure 10 has been wrapped around the substrate 22 more than two full circuits.

Figure 6A:
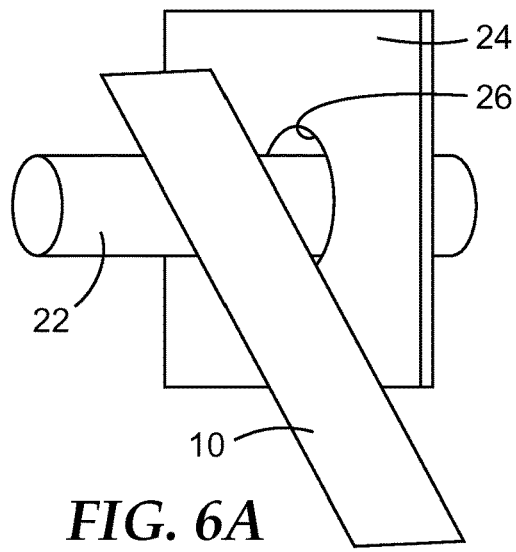
FIG. 6(a) is a partial perspective view of a polymeric structure and a substrate, according to another embodiment.
Figure 6B:
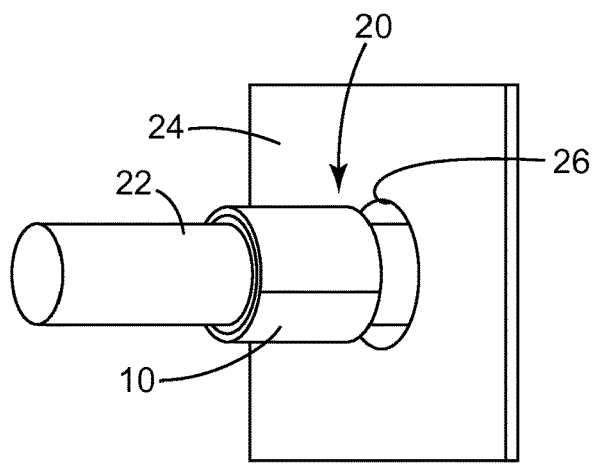
FIG. 6(b) is a partial perspective view of an article including the polymeric structure of FIG. 6(a) wrapped around the substrate of FIG. 6(a).
Figure 6C:
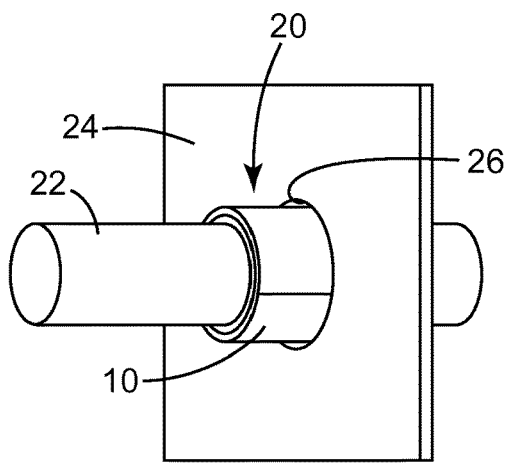
FIG. 6(c) is a partial perspective view of the article of FIG. 6(b) in which the polymeric structure has been positioned within an aperture of another substrate.
Figure 6D:
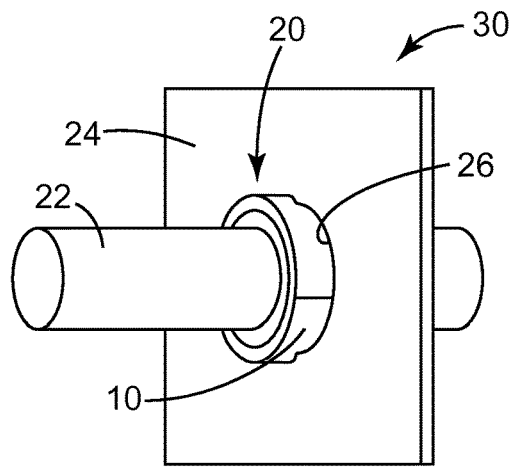
FIG. 6(d) is a partial perspective view of the article of FIG. 6(c) following subjection of the polymeric structure to elevated temperature.

The method further preferably comprises positioning the polymeric structure 10 at least partially within the aperture 26. FIG. 6(c) illustrates the article 20 in which the polymeric structure 10 has been moved a distance of at least a quarter of the width of the polymeric structure, into the aperture 26 defined by the second substrate 24. Alternatively, the second substrate 24 is optionally moved while the polymeric structure 10 remains in place. The method further includes forming the second article 30 by subjecting the polymeric structure 10 to an elevated temperature above the transition temperature of the crosslinked polymeric layer and below the degradation temperature of the crosslinked polymeric layer and any other components present in the polymeric structure 10. The thickness of the polymeric structure is thereby increased and the width of the polymeric structure 10 is concomitantly decreased. FIG. 6(d) includes the article 30 in which the polymeric structure 10 has created at least a partial joint between the first substrate 22 and the second substrate 24. In the embodiment of FIG. 6(d), the thickness of the polymeric structure 10 increased to an extent that the outer diameter of the polymeric structure 10 is at least as large as the inner diameter of the aperture 26 in the second substrate 24.

Various items are described that are articles or methods of making articles.

Item 1 is an article comprising a polymeric structure having a length, a width, and a thickness, wherein the length of the polymeric structure is greater than the width of the polymeric structure. The polymeric structure includes a crosslinked polymeric layer uniaxially oriented in the width direction at a draw ratio of at least 1.2:1, a first adhesive layer adjacent to a first major surface of the crosslinked polymeric layer, and a second adhesive layer adjacent to a second major surface of the crosslinked polymeric layer.

Item 2 is an article of item 1, wherein the polymeric structure further includes at least one additive including flame retardants, inorganic fillers, magnetic susceptors, antioxidants, or combinations thereof.

Item 3 is an article of item 1 or item 2, wherein the crosslinked polymeric layer is oriented at a draw ratio of at least 2:1.

Item 4 is an article of any one of items 1 to 3, wherein the crosslinked polymeric layer is oriented in the width direction at a draw ratio of at least to 3:1.

Item 5 is an article of any one of items 1 to 3, wherein the crosslinked polymeric layer is oriented in the width direction at a draw ratio of 1.2:1 to 4:1.

Item 6 is an article of any one of items 1 to 5, wherein the crosslinked polymeric layer shrinks in the width direction by more than 10% upon subjection to temperature above the transition temperature of the crosslinked polymeric layer and below the degradation temperature of each of the crosslinked polymeric layer, the first adhesive layer, and the second adhesive layer.

Item 7 is an article of any one of items 1 to 6, wherein the crosslinked polymeric layer shrinks in the width direction by more than 50% upon subjection to temperature above the transition temperature of the crosslinked polymeric layer and below the degradation temperature of each of the crosslinked polymeric layer, the first adhesive layer, and the second adhesive layer.

Item 8 is an article of any one of items 1 to 7, wherein the crosslinked polymeric layer shrinks in the length direction by less than 10% upon subjection to temperature above the transition temperature of the crosslinked polymeric layer and below the degradation temperature of each of the crosslinked polymeric layer, the first adhesive layer, and the second adhesive layer.

Item 9 is an article of any one of items 1 to 8, wherein the crosslinked polymeric layer comprises a polyolefin, a polyurethane, a polyvinyl chloride, a polyester, or an ethylenevinylacetate polymer.

Item 10 is an article of any one of items 1 to 9, wherein the first adhesive layer and the second adhesive layer each includes a material independently selected from a polyisobutylene, a block copolymer, an ethylenevinylacetate polymer, a polycyclooctene, an acrylic polymer, a synthetic rubber, a silicone polymer, a polyamide, a polyurethane, and combinations thereof.

Item 11 is an article of any one of items 1 to 10, wherein the first adhesive layer comprises a hot melt adhesive.

Item 12 is an article of any one of items 1 to 11, wherein the second adhesive layer includes a pressure sensitive adhesive.

Item 13 is an article of any one of items 1 to 12, wherein at least one of the first adhesive layer and the second adhesive layer has a modulus between 0.1 megaPascals (MPa) and 2000 MPa at 23 degrees Celsius.

Item 14 is an article of any one of items 1 to 13, further including a primer layer disposed between the first major surface of the crosslinked polymeric layer and the first adhesive layer, between the second major surface of the crosslinked polymeric layer and the second adhesive layer, or both.

Item 15 is a method of making an article including providing a polymeric structure having a length, a width and a thickness, wherein the length of the polymeric structure is greater than the width of the polymeric structure. The polymeric structure comprises a crosslinked polymeric layer uniaxially oriented in the width direction at a draw ratio of at least 1.2:1. The method also includes wrapping the polymeric structure around a first substrate at least two full circuits, positioning the polymeric structure at least partially into an aperture defined by a second substrate, and subjecting the polymeric structure to an elevated temperature above the transition temperature of the crosslinked polymeric layer and below the degradation temperature of the crosslinked polymeric layer and any other components present in the polymeric structure. The thickness of the polymeric structure is thereby increased, creating at least a partial joint between the first substrate and the second substrate.

Item 16 is a method of item 15, wherein the polymeric structure further comprises a first adhesive layer adjacent to a first major surface of the crosslinked polymeric layer.

Item 17 is a method of item 15 or item 16, wherein the polymeric structure further includes a second adhesive layer adjacent to a second major surface of the crosslinked polymeric layer.

Item 18 is a method of item 15 or item 16, wherein the first adhesive layer includes polyisobutylene, a block copolymer, an ethylenevinylacetate polymer, a polycyclooctene, an acrylic polymer, a synthetic rubber, a silicone polymer, a polyamide, a polyurethane, or a combination thereof.

Item 19 is a method of item 17, wherein the second adhesive layer includes a polyisobutylene, a block copolymer, an ethylenevinylacetate polymer, a polycyclooctene, an acrylic polymer, a synthetic rubber, a silicone polymer, a polyamide, a polyurethane, or a combination thereof.

Item 20 is a method of item 16 or item 18, wherein the first adhesive layer includes a hot melt adhesive.

Item 21 is a method of item 17 or item 19, wherein the second adhesive layer includes a pressure sensitive adhesive.

Item 22 is a method of item 16, wherein the first adhesive layer is in contact with the first substrate.

Item 23 is a method of any one of items 15 to 22, including sliding the polymeric structure a distance of at least a quarter of the width of the polymeric structure into the aperture defined by the second substrate.

Item 24 is a method of any one of items 15 to 23, including sliding the polymeric structure a distance of at least half of the width of the polymeric structure into the aperture defined by the second substrate.

Item 25 is a method of any one of items 15 to 24, wherein the width of the polymeric structure decreases by at least 10% and the thickness of the polymeric structure increases when subjected to the elevated temperature.

Item 26 is a method of any one of items 15 to 25, wherein the width of the polymeric structure decreases by between 10% and 80% when subjected to the elevated temperature.

Item 27 is a method of any one of items 15 to 25, wherein the width of the polymeric structure decreases by at least 50% when subjected to the elevated temperature.

Item 28 is a method of any one of items 16 to 27, wherein at least one of the first adhesive layer and the second adhesive layer has a modulus of at least 0.1 MPa.

Item 29 is a method of any one of items 15 to 28, wherein the thickness of the polymeric structure increases to an extent that the outer diameter of the polymeric structure is at least as large as the inner diameter of the aperture in the second substrate.

Item 30 is a method of any one of items 15 to 29, wherein the polymeric structure adheres to the second substrate.

Item 31 is a method of any one of items 15 to 30, wherein the polymeric structure contacts the second substrate such that water applied to the joint between the first substrate and the second substrate at a pressure of 6000 Pascals (Pa) passes between the polymeric structure and the second substrate at a rate of 4 milliliters per second (mL/s) or less, or 3 milliliters per second per square centimeter ($mL \cdot s^{-1} \cdot cm^{-2}$) or less.

Item 32 is a method of any one of items 15 to 31, wherein the polymeric structure contacts the second substrate such that when water is applied to the joint between the first substrate and the second substrate at a pressure of 6000 Pascals (Pa) for 24 hours no measurable amount of water passes between the polymeric structure and the second substrate.

Item 33 is a method of any one of items 15 to 32, wherein the first substrate includes a pipe, a cable, a tube, a rod, a wire, or a bundle of one or more of combinations thereof.

Item 34 is a method of any one of items 15 to 33, wherein the second substrate comprises plastic, wood, metal, glass, ceramic, concrete, composite material, or a combination thereof.

Item 35 is a method of any one of items 15 to 34, wherein the subjecting to the elevated temperature includes heating the polymeric structure with hot air, resistive heat, inductive heat, conductive heat, IR light, steam, flame, or combinations thereof.

Item 36 is a method of any one of items 15 to 34, wherein the subjecting to the elevated temperature includes heating the polymeric structure with a lamp, a torch, a heat gun, or combinations thereof.

Item 37 is a method of any one of items 15 to 36, wherein the polymeric structure is heated to a temperature of 60 to 150 degrees Celsius.

Item 38 is a method of any one of items 15 to 37, wherein the length of the polymeric structure decreases by less than 10% when subjected to the elevated temperature.

Item 39 is a method of any one of items 15 to 38, wherein the polymeric structure further includes at least one additive including flame retardants, fillers, magnetic susceptors, antioxidants, and combinations thereof.

Item 40 is a method of any one of items 15 to 39, wherein the crosslinked polymeric layer comprises a polyolefin, a polyurethane, a polyvinyl chloride, a polyester, or an ethylenevinylacetate polymer.

Item 41 is a method of any one of items 16 to 32, further comprising a primer layer disposed between the first major surface of the crosslinked polymeric layer and the first adhesive layer between second major surface of the crosslinked polymeric layer and the second adhesive layer, or both.

Item 42 is a method of any one of items 15 to 41, wherein the first substrate comprises no accessible end.

Item 43 is an article including a first substrate and a polymeric structure wrapped around the first substrate at least two full circuits. The polymeric structure has a length, a width and a thickness, and comprises a crosslinked polymeric layer uniaxially oriented in the width direction at a draw ratio of at least 1.2:1. The length of the polymeric structure is greater than the width of the polymeric structure.

Item 44 is an article of item 43, wherein when the article is positioned at least partially within an aperture defined by a second substrate and the polymeric structure is subjected to an elevated temperature above the transition temperature of the crosslinked polymeric layer and below the degradation temperature of the crosslinked polymeric layer and any other components present in the polymeric structure, the thickness of the polymeric structure increases, and at least a partial joint is created between the first substrate and the second substrate.

Item 45 is an article of item 44, wherein the polymeric structure contacts the second substrate such that water applied to the joint between the first substrate and the second substrate at a pressure of 6000 Pascals (Pa) passes between the polymeric structure and the second substrate at a rate of 4 milliliters per second (mL/s) or less, or 3 milliliters per second per square centimeter ($mL \cdot s^{-1} \cdot cm^{-2}$) or less.

Item 46 is an article of item 45, wherein the polymeric structure contacts the second substrate such that water applied to the joint between the first substrate and the second substrate at a pressure of 6000 Pascals (Pa) passes between the polymeric structure and the second substrate at a rate of 2 milliliters per second (mL/s) or less.

Item 47 is an article of item 46, wherein the polymeric structure contacts the second substrate such that when water is applied to the joint between the first substrate and the second substrate at a pressure of 6000 Pascals (Pa) for 24 hours no measurable amount of water passes between the polymeric structure and the second substrate.

Item 48 is an article of item 44, wherein when the thickness of the polymeric structure is increased, the outer diameter of the polymeric structure is at least as large as the inner diameter of the aperture in the second substrate.

Item 49 is an article of item 44, wherein when the thickness of the polymeric structure is increased, the outer diameter of the polymeric structure is larger than the inner diameter of the aperture in the second substrate.

Item 50 is an article of any one of items 44 to 48, wherein when the thickness of the polymeric structure is increased, the polymeric structure adheres to the second substrate.

Item 51 is an article of any one of items 44 to 50, wherein the subjecting to the elevated temperature includes heating the polymeric structure with hot air, resistive heat, inductive heat, conductive heat, IR light, steam, flame, or combinations thereof.

Item 52 is an article of any one of items 44 to 51, wherein the subjecting to the elevated temperature includes heating the polymeric structure with a lamp, a torch, a heat gun, or combinations thereof.

Item 53 is an article of any one of items 44 to 51, wherein the polymeric structure is heated to a temperature of 60 to 150 degrees Celsius.

Item 54 is an article of any one of items 44 to 53, wherein the length of the polymeric structure decreases by less than 10% when subjected to the elevated temperature.

Item 55 is an article of any one of items 43 to 45, wherein the polymeric structure further comprises a first adhesive layer adjacent to a first major surface of the crosslinked polymeric layer.

Item 56 is an article of item 55, wherein the polymeric structure further comprises a second adhesive layer adjacent to a second major surface of the crosslinked polymeric layer.

Item 57 is an article of item 55, wherein the first adhesive layer comprises a hot melt adhesive.

Item 58 is an article of item 56, wherein the second adhesive layer includes a pressure sensitive adhesive.

Item 59 is an article of item 56, wherein the first adhesive layer and the second adhesive layer each includes a material independently selected from a polyisobutylene, a block copolymer, an ethylenevinylacetate polymer, a polycyclooctene, an acrylic polymer, a synthetic rubber, a silicone polymer, a polyamide, a polyurethane, and a combination thereof.

Item 60 is an article of any one of items 43 to 59, wherein the polymeric structure further includes at least one additive including flame retardants, inorganic fillers, magnetic susceptors, antioxidants, and combinations thereof.

Item 61 is an article of any one of items 43 to 60, wherein the crosslinked polymeric layer is oriented at a draw ratio of at least 2:1.

Item 62 is an article of any one of items 43 to 61, wherein the crosslinked polymeric layer is oriented in the width direction at a draw ratio of at least to 3:1.

Item 63 is an article of any one of items 43 to 62, wherein the crosslinked polymeric layer is oriented in the width direction at a draw ratio of 1.2:1 to 4:1.

Item 64 is an article of any one of items 43 to 63, wherein the crosslinked polymeric layer shrinks in the width direction by at least 10% upon subjection to temperature above the transition temperature of the crosslinked polymeric layer and below the degradation temperature of the crosslinked polymeric layer and any other components present in the polymeric structure.

Item 65 is an article of any one of items 43 to 64, wherein the crosslinked polymeric layer shrinks in the width direction by between 10% and 80% upon subjection to temperature above the transition temperature of the crosslinked polymeric layer and below the degradation temperature of the crosslinked polymeric layer and any other components present in the polymeric structure.

Item 66 is an article of any one of items 43 to 65, wherein the crosslinked polymeric layer shrinks in the length direction by less than 10% upon subjection to temperature above the transition temperature of the crosslinked polymeric layer and below the degradation temperature of the crosslinked polymeric layer and any other components present in the polymeric structure.

Item 67 is an article of any one of items 43 to 66, wherein the crosslinked polymeric layer comprises a polyolefin, a polyurethane, a polyvinyl chloride, a polyester, or an ethylenevinylacetate polymer.

Item 68 is an article of item 55, wherein the first adhesive layer has a modulus between 0.1 megaPascals (MPa) and 2000 MPa at 23 degrees Celsius.

Item 69 is an article of item 56, wherein the second adhesive layer has a modulus between 0.1 megaPascals (MPa) and 2000 MPa at 23 degrees Celsius.

Item 70 is an article of item 55 or item 57, wherein the polymeric structure further includes a primer layer disposed between the first major surface of the crosslinked polymeric layer and the first adhesive layer.

Item 71 is an article of item 56 or item 58, wherein the polymeric structure further includes a primer layer disposed between the second major surface of the crosslinked polymeric layer and the second adhesive layer.

Item 72 is an article of any one of items 43 to 71, wherein the first substrate includes a pipe, a cable, a tube, a rod, a wire, or a bundle of one or more of combinations thereof.

Item 73 is an article of any one of items 43 to 72, wherein the second substrate comprises plastic, wood, metal, glass, ceramic, concrete, composite material, or a combination thereof. Item 74 is an article of any one of items 43 to 73, wherein the first substrate comprises no accessible end.

EXAMPLES

Objects and advantages of this invention are further illustrated by the following examples, but the particular materials and amounts thereof recited in these examples, as well as other conditions and details, should not be construed to unduly limit this invention. These examples are for illustrative purposes only and are not meant to be limiting on the scope of the appended claims.

Materials

Unless otherwise noted, all parts, percentages, ratios, etc., in the examples and in the remainder of the specification are by weight. Unless otherwise noted, all chemicals were obtained from, or are available from, chemical suppliers such as Sigma-Aldrich Chemical Company, St. Louis, Mo.

| Designation | Description | Trade Designation | Manufacturer |
|---|---|---|---|
| M1 | Polyisobutylene (PIB), Mw = 3.4 × 10$^5$ g/mole (medium molecular weight PIB) | OPPANOL B50 | BASF Corp., Florham Park, NJ |
| M2 | PIB, Mw = 1.1 × 10$^6$ g/mole (high molecular weight PIB) | OPPANOL B100 | BASF Corp., Florham Park, NJ |
| M3 | PIB, Mw = 2.5 × 10$^6$ g/mole (high molecular weight PIB) | OPPANOL B150 | BASF Corp., Florham Park, NJ |
| M4 | A hydrogenated hydrocarbon tackfier | ESCOREZ E5340 | ExxonMobil Chemical Co., Houston, TX. |
| M5 | 98:2 Isooctyl acrylate/ acrylic acid copolymer | | The copolymer was prepared according to Polymerization Process A in WO0078884. |

| Designation | Description | Trade Designation | Manufacturer |
| --- | --- | --- | --- |
| M6 | Functionalized PIB (contains: 33 wt % ($C_{10}$-$C_{14}$ liquid paraffin) solvent, 13 wt. % hydrogenated PIB, and 54 wt. % of ~1000 g/mol of amine-terminated PIB). It was used as received from BASF. | KEROCOM PIBA 03 | BASF Corp., Florham Park, NJ |
| LINER L1 | Adhesive carrier (i.e., release liner) | CLEARSIL T30 | CP Films, Inc., Martinsville, VA. |
| LINER L2 | Adhesive carrier (i.e., release liner) | CLEARSIL T10 | CP Films, Inc., Martinsville, VA. |
| SF-1 | Crosslinked polyolefin shrink film, 0.08 mm thick | CORTUFF 300 | Sealed Air, Elmwood Park, NJ |
| TAPE PRIMER 94 | Tape primer | 3M TAPE PRIMER 94 | 3M Company, St. Paul, MN |
| KRATON D1102 | Linear triblock copolymer based on styrene and butadiene, with a polystyrene content of 28% | KRATON D1102 | Kraton Polymer, Houston, TX |
| VESTENAMER 8012 | Polyoctenamer with high trans content | VESTENAMER 8012 | Evonik Degussa, GmbH, Essen, Germany |
| ST 1 | Very flexible, heat shrinkable crosslinked polyolefin tubing, 0.64 cm (¼ inch) diameter | 3M SFTW 203 TUBING | 3M Company, St. Paul, MN |
| ST 2 | Flexible crosslinked polyolefin with an internal layer of thermoplastic adhesive, 1.27 cm (½ inch) diameter | 3M HEAT SHRINK TUBING EPS 203 | 3M Company, St. Paul, MN |
| DiARY MM9020 | Thermoplastic physically crosslinked polyurethane resin | DiARY MM9020 | SMP Technologies, Tokyo, Japan |
| HOT MELT 3792 | Hot melt adhesive | 3M SCOTCH-WELD Hot Melt Adhesive 3792 | 3M Company, St. Paul, MN |
| PSA 467MP | Acrylic pressure sensitive adhesive tape | 3M Adhesive Transfer Tape 467MP | 3M Company, St. Paul, MN |
| POLYESTER TAPE 8403 | Polyester adhesive tape | 3M Polyester Tape 8403 | 3M Company, St. Paul, MN |
| SF 2 | Biaxially oriented crosslinked polyolefin shrink film | HPGF 100 | Bemis Clysar, Oshkosh, WI |
| ADHESIVE REMOVER 6040 | Citrus base aerosol adhesive remover | 3M Adhesive Remover 6040 | 3M Company, St. Paul, MN |

Test Methods

General Leak Test Method

Articles (i.e., substrates wrapped with polymeric structures) were mounted in apertures within flat sheets as described below. The flat sheet assemblies were then mounted to the bottom end of a vertically-oriented polyvinyl chloride pipe (7.9 cm inside diameter, 61 cm long) using a flange on the pipe and a silicone rubber gasket between the flange and the sheet. The pipe was filled to the top with water to produce 6000 Pascals (Pa) of water pressure. Any water leaking though the seal in the flat sheet was collected for a measured amount of time, and the volume of collected water was divided by the collection time to calculate an average rate of water leakage for the assembly. Also, the area of the substrate was subtracted from the area of the aperture to give the area of the initial space that was intended to be sealed by the tape, and the leakage rate was divided by that area to give a leakage rate per unit area (i.e., centimeters squared ($cm^2$)).

General Shrinkage Test

Pieces of tape (i.e., polymeric structure) were die cut to 12.7 millimeters (mm) wide and 63.5 mm long. These pieces of tape were placed on a piece of LINER L2 in an oven at 120° C. without constraint for five minutes. After cooling, the resulting length and width were measured and reported as a percentage of the original dimensions.

Preparative Example 1 (PE1)

This adhesive film was prepared to use as a tape component. The adhesive was prepared by mixing appropriate material components as specified in Table 1, below. Mixing containers were glass jars unless specified otherwise. All PIB polymers were used as toluene solutions. M4 was added to the adhesive formulations as a white solid. M5 was used as a 28% solids mixture in ethyl acetate/heptane (having a ratio of approximately 44:56 ethyl acetate to heptane). M6 was added to the adhesive formulations as supplied. After all the components had been added, the jars of adhesive formulations were sealed with a TEFLON-lined metal cap, TEFLON tape, and SCOTCH BRAND electrical tape and were mixed by rolling on rollers for 16 hours at ambient temperature.

The adhesive solution was then coated onto 25 centimeters (cm) (10 inches) wide LINER L1 using a knife coater with a 0.5 mm (21 mil) gap at about 91 cm (3 feet) per minute. The adhesive was dried in 3-consecutive ovens at 41° C. (105° F.) for 2.75 m (9 feet), 55° C. (130° F.) for 2.75 meters (m) (9 feet), and 88° C. (190° F.) for 5.5 m (18 feet). After drying, 30 cm (12 inches) wide LINER L2 was laminated to the top of the adhesive and the construction was wound onto a 4.5 cm (3 inch) diameter cardboard core. The adhesive thickness was approximately 45 micrometers (μm) (3 mils).

TABLE 1

| Component: | M1 (20 wt % in toluene) | M2 (10 wt % in toluene) | M3 (10 wt % in toluene) | M4 | M5 | M6 |
|---|---|---|---|---|---|---|
| wt. % of component in mixture | 17.5 | 30 | 20 | 27.5 | 2.5 | 2.5 |
| Weight of component (g) added to mixture | 350 | 1200 | 1230.8 | 110 | 35.7 | 10 |

Example 1 (E1)

A piece of SF-1, approximately 60 cm wide and 120 cm long, was heated to 120° C. without constraint to relax it to new, unoriented dimensions of approximately 20 cm wide, 40 cm long, and 0.9 mm thick. Each longer edge of this film was clamped between two flat steel bars, and the clamped film was placed in a 120° C. oven for 3 minutes. While hot, the clamped edges were separated by hand and held in the stretched state while the film cooled. The middle section of the film had increased in width by a degree ranging from 200% to 300%. The result was a cross-web oriented shrink film.

Figure 7A:
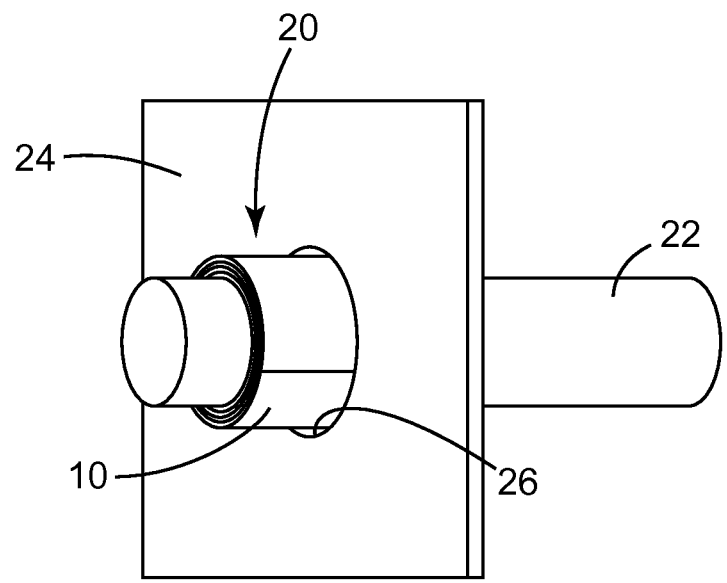
FIG. 7(a) is a partial perspective view of an article including a polymeric structure wrapped around a first substrate and positioned within the aperture of a second substrate.

The film was then rinsed briefly with toluene and wiped on one side with TAPE PRIMER 94. The same side of the film was then coated with a solution of 25% KRATON D1102 (i.e., block copolymer) in toluene with a wet thickness of 0.08 mm and the coating was allowed to dry at room temperature. A sample of this tape was subjected to the shrinkage test described above with a result of 27% width and 104% length remaining after shrinking. A strip of tape (3.8 cm wide and 23 cm long) was cut from the center of the larger piece of film with the shorter dimension of the film parallel to the direction of orientation of the film. The tape (i.e., polymeric structure) thickness varied from 0.25 mm at one end to 0.46 mm at the other end. The tape was wrapped with approximately four full wraps around a copper pipe (outside diameter of 1.6 cm), and the resulting wrapped pipe had an outside diameter of 2.0 cm. The surface of the tape with the KRATON D1102 coating was on the outside of the tape coil. This wrapped pipe was inserted into a 2.0 cm hole in a stainless steel plate (2.6 mm thick). An illustration of the wrapped pipe inserted into the plate is provided in FIG. 7(a). More specifically, FIG. 7(a) illustrates an article 20 in which the polymeric structure 10 (i.e., tape) has been wrapped around the first substrate 22 (i.e., pipe) about four full circuits. The article 20 is disposed in an aperture 26 defined by a second substrate 24 (i.e., stainless steel plate).

Figure 7B:
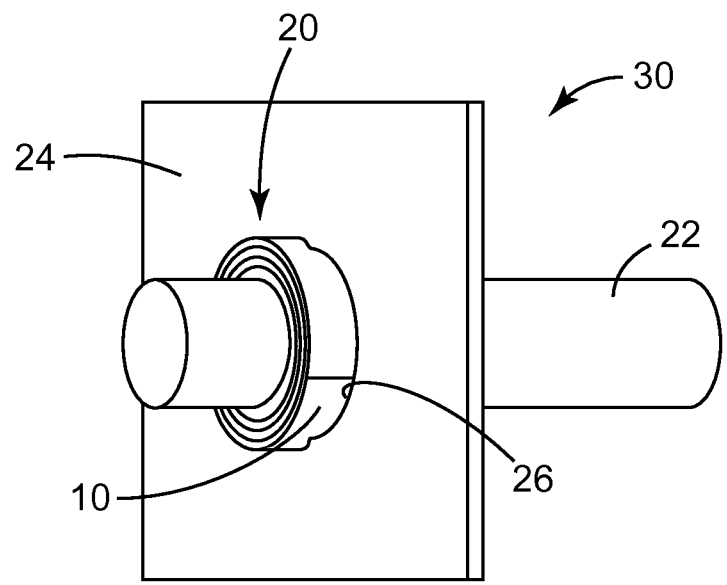
FIG. 7(b) is a partial perspective view of the article of FIG. 7(a) following subjection of the polymeric structure to elevated temperature.

The tape of the wrapped pipe was heated for 2 minutes and 40 seconds using a heat gun (Master Heat Gun, temperature range of 149° C.-260° C., obtained from Master Appliance, Racine, Wis.). The tape contracted in the cross-web (width) direction and reached a width of 1.3 cm, and the wrapped pipe reached a diameter of 2.6 cm. An illustration of the article following heating is provided in FIG. 7(b). FIG. 7(b) provides a partial perspective view of an article 30, which includes the article 20 following subjection of the polymeric structure 10 (i.e., tape) to the elevated temperature from the heat gun, whereby the polymeric structure 10 has created at least a partial joint between the first substrate 22 and the second substrate 24. The thickness of the polymeric structure 10 was increased and the width of the polymeric structure 10 was concomitantly decreased. In this embodiment, the thickness of the polymeric structure 10 increased to an extent that the outer diameter of the polymeric structure 10 was larger than the inner diameter of the aperture 26 in the second substrate 24.

Example 2 (E2)

A piece of SF 1 film prepared to be a relaxed film as described in E1, was clamped and placed in a 130° C. oven for 3 minutes. While hot, the clamped edges were separated by hand and held in the stretched state while the film cooled. The middle section of the film had increased in width by 300%.

The cross-web-oriented film was then rinsed briefly with heptane and treated on one surface with a hand-held corona treater (Model BD-20AC, obtained from Electro-Technic Products, Inc. Chicago, Ill.) for two minutes. The same surface of the film was then wiped with TAPE PRIMER 94. After drying for two minutes, a film of PIB adhesive film prepared in PE1 was laminated to the primed surface.

A strip of laminated tape (3.8 cm wide and 19 cm long) was cut from the center of the larger piece of film with the shorter dimension of the film parallel to the direction of orientation of the film. The tape (i.e., polymeric structure) thickness varied from 0.36 mm at one end to 0.43 mm at the other end. The tape was wrapped around a copper pipe (outside diameter of 1.6 cm) with approximately three full wraps, and the resulting wrapped pipe had an outside diameter of 1.9 cm. The surface of the tape with the PIB adhesive film was on the outside of the tape coil. The wrapped pipe was inserted into a 2.0 cm hole in a stainless steel plate (2.6 mm thick). The tape of the wrapped pipe was heated for 3 minutes using a heat gun. The tape contracted in the cross-web (width) direction and reached a width of 2.0 cm, and the wrapped pipe reached a diameter of 2.3 cm.

Example 3 (E3)

A piece of cross-web-oriented SF 1 film prepared as described in E2 above was wiped on one side with TAPE PRIMER 94. A film of VESTENAMER 8012 (i.e., polycyclooctene, 0.15 mm thick) was laminated to the oriented shrink film with sufficient heat to melt the polycyclooctene, but not relax the shrink film (temperatures between 60° C. and 90° C.). A sample of this film was subjected to the shrinkage test with a result of 26% width and 112% length remaining after shrinking.

A strip of tape (2.5 cm wide and 20 cm long) was cut from the center of the larger piece of film with the shorter dimension of the tape parallel to direction of orientation of the film. This tape (i.e., polymeric structure) was wrapped around a copper pipe (outside diameter of 1.6 cm) with more than three full wraps. The surface of the tape with the polycyclooctene layer was on the outside of the tape coil. This wrapped pipe was inserted into a 2.0 cm hole in a stainless steel plate (2.6 mm thick). The tape of the wrapped pipe was heated for 1 minute and 30 second using a heat gun.

The tape contracted in the cross-web (width) direction and reached a width of 1.4 cm, and the wrapped pipe reached a diameter of 2.5 cm.

Example 4 (E4)

A piece of ST 1 was split lengthwise. The convex side of this slit tube was pressed down onto a 130° C. hot plate using a room temperature plate of aluminum, and it was pulled along the hot plate surface such that each point on the film's surface was in contact with the hot surface for approximately 5 seconds. The result was a flat film approximately 2.0 cm wide and 0.25 mm thick. Both faces of the film were wiped with TAPE PRIMER 94. The PIB adhesive film prepared in PE1 was then laminated to both of the primed faces of the film. The resulting film was cut to 1.9 cm wide and 27.7 cm long, and was 0.41 mm thick. The tape (i.e., polymeric structure) was then wrapped around a copper pipe (outside diameter of 1.6 cm) with more than 4 full wraps. The wrapped pipe was inserted into a 2.0 cm hole in a stainless steel plate (2.6 mm thick). The tape of the wrapped pipe was heated for approximately 3 minutes using a heat gun. The resulting grommet-like seal was 1.1 cm wide, and the wrapped pipe was 2.4 cm in diameter.

Preparative Example 2 (PE 2)

A piece of ST 2 with a 1.22 m (48 inches) length was split lengthwise. The convex side of this slit tube was passed over the surface of a 130° C. hot plate several times to flatten the strip. The result was a flat film approximately 4.3 cm wide and 0.71 mm thick with a thermoplastic adhesive on one face. A sample of this film was subjected to the shrinkage test with a result of 43% width and 93% length remaining after shrinking.

Preparative Example 3 (PE 3)

The tape (i.e., polymeric structure) prepared in PE 2 was modified by wiping the non-adhesive face with TAPE PRIMER 94. One liner from a strip of PIB adhesive film prepared in PE1 (more than 5 cm wide and more than 120 cm long) was then removed and the primed surface of the tape prepared above was laminated to the PIB adhesive film at room temperature. The excess margins of PIB adhesive film were trimmed away to produce a flat tape approximately 4.3 cm wide and 0.83 mm thick with a thermoplastic adhesive on one face and a pressure sensitive adhesive covered by a liner on the other face. A sample of this tape was subjected to the shrinkage test with a result of 43% width and 93% length remaining after shrinking.

Example 5 (E5)

The tape (i.e., polymeric structure) prepared above in PE 3 was cut to 14 cm in length and wrapped around a piece of copper pipe (outside diameter of 1.6 cm, 15 cm long, capped with copper cap) to produce a coil of between two and three full wraps of tape with the thermoplastic adhesive on the inward face of the coil. The pressure sensitive adhesive prevented the coil from unwinding spontaneously. The copper pipe was centered within a 2.1 cm diameter opening in the middle of a sheet of galvanized steel (20 cm×20 cm×0.09 cm). The tape coil was slid along the pipe into the center of the opening in the galvanized sheet. The tape of the wrapped pipe was heated with a heat gun (Model HG-301A, obtained from Master Heat Gun, Racine, Wis.) set at 260° C. for 3 minutes with heat applied uniformly to the wrapped pipe on both sides of the galvanized sheet. The coil shortened in width and increased in diameter to make a grommet-like seal and form an assembly, and the assembly was allowed to cool. The assembly was subjected to the leak test described above, and no water was observed to leak through the seal for more than two weeks.

Example 6 (E6)

E6 was prepared in the same manner as E5, except with a modified heating method. In E6, a liquid propane torch was directly applied only to one side of the galvanized sheet and the copper pipe protruding from that side of the sheet. Heat was applied for 75 seconds, then the sample was allowed to rest for 60 seconds, then heat was applied for another 45 seconds. The tape (i.e., polymeric structure) contracted in width and increased in diameter on both sides of the galvanized sheet to form an assembly, which suggests that the unheated side of the wrapped pipe reached a sufficiently high temperature due to heat that was transferred from the directly heated side of the assembly. Upon leak testing for over 24 hours, no water appeared to leak through the seal.

Comparative Example A (CE A)

A copper pipe identical to the one used in E5 was mounted within a 2.1 cm opening of a galvanized sheet identical to the one used in E5 using clamps with no seal between the pipe and the sheet. Upon subjecting this assembly to a leak test, the leak rate exceeded 100 mL per second, or 69 mL·s$^{-1}$·cm$^{-2}$.

Example 7 (E7)

E7 was run using tapes (i.e., polymeric structures) prepared in PE 2 and tested in the same manner as in E5, except that the thermoplastic adhesive layer was on the outward face of the coil and there was no adhesive on the inward face of the coil. Upon leak testing, the leak rate was 4 mL per second, or 2.8 mL·s$^{-1}$·cm$^{-2}$.

Example 8 (E8)

E8 was run using tapes (i.e., polymeric structures) prepared in PE 2 and tested in the same manner as E7 except that the thermoplastic adhesive layer was on the inward face of the coil and there was no adhesive on the outward face of the coil. To prevent the coil from unwinding spontaneously, the coil had to be gently squeezed by hand, and this pressure made it difficult to slide the coil along the pipe. Isopropanol was applied to the pipe surface to lubricate the interface between the pipe and the thermoplastic adhesive, and then the coil was easily slid along the pipe into the center of the opening in the galvanized sheet. After 5 minutes to let the isopropanol evaporate, the tape was heated as done in E5 and E7. Upon leak testing, the leak rate was 0.5 mL per second, or 0.3 mL·s$^{-1}$·cm$^{-2}$.

Example 9 (E9)

A piece of the tape (i.e., polymeric structure) prepared in PE 3 was cut to 10 cm in length and wrapped around a piece of insulated electrical cable (10 gauge, 3 conductor, NM type, 15 cm long, average diameter of 0.98 cm, sealed on each end with a silicone grease) to produce a coil of between 2 and 2.5 full wraps of tape with the thermoplastic adhesive on the inward face of the coil. The pressure sensitive adhesive prevented the coil from unwinding spontaneously. The cable was centered within a 1.6 cm diameter opening in the middle of a sheet of acrylonitrile butadiene styrene (ABS) plastic (20 cm×20 cm×0.64 cm). The tape coil was slid along the cable into the center of the opening in the ABS sheet. The tape of the wrapped cable was heated with a heat gun set at 150° C. for 4 minutes with heat applied uniformly to both sides to form an assembly. The coil shortened in width and increased in diameter to make a grommet-like seal and form an assembly, and the assembly was allowed to cool. Upon leak testing, the leak rate was 1.2 mL/second, or 0.96 mL·s$^{-1}$·cm$^2$.

Example 10 (E10)

A piece of the tape (i.e., polymeric structure) prepared in PE 3 was used and tested in the same manner as E9 except that the tape was initially 13 cm long and the coil on the cable had between 2.5 and 3 full wraps. Upon testing, the leak rate was 0.2 mL/second, or 0.2 mL·s$^{-1}$·cm$^{-2}$.

Example 11 (E11)

Pellets of DiARY MM9020 (6 grams) were placed on a piece of LINER L2 between two spacer strips each made from three layers of Polyester Tape 8403. An additional piece of LINER L2 was placed on top of the urethane. This stack was placed in a hydraulic press at 176° C. (350° F.) and heated with no pressure for two minutes. Then, 130 kilo-Newtons (kN) of compression force was applied for five minutes. The resulting polyurethane film was 0.18 mm thick. This film was placed in a 115° C. oven for 20 minutes and then stretched by hand uniaxially in the width direction to 50% elongation to produce a film 0.10 mm thick. A cylindrical piece of HOT MELT 3792 (1.5 cm diameter×1.9 cm long) was placed on the urethane film between pieces of LINER L2 and pressed in a hydraulic press at 164° F. (73° C.) for 90 seconds with 130 kN of compression force. The resulting laminate was 0.23 mm thick. An acrylic PSA 467MP tape was laminated of the other face of the urethane film. A sample of this film was subjected to the shrinkage test with a result of 64% width and 113% length. An additional strip (2.5 cm×7 cm) of tape (i.e., polymeric structure) was cut from this laminate and wrapped with two full wraps around a stainless steel tube (15 cm long, 0.64 cm outside diameter), and then the wrapped tube was placed within a 0.95 cm diameter opening in a sheet of galvanized steel (20 cm×20 cm×0.09 cm). The coil was slid down the tube into the center of the opening. The tape of the wrapped tube was heated with a heat gun for 1 minute and 45 seconds. The coil decreased in width to 1.85 cm and the wrapped tube increased in diameter to an average of 0.96 cm. Upon testing, water leaked at a rate of 0.1 mL per second, or 0.3 mL·s$^{-1}$·cm$^{-2}$.

Example 12 (E12)

A piece of SF 2 shrink film (210 cm×25 cm×0.03 mm) was heated with a heat gun to relax it and remove its orientation. It was then oriented in the width direction using the same method used in E1 to produce a film 0.05 mm thick. HOT MELT 3792 was placed on a piece of this film (17 cm×10 cm), and sheets of LINER L2 were placed on both sides. This stack was pressed at 73° C. (164° F.) with 80 IN of applied compression force for three minutes. The resulting film was a laminate of the shrink film and hot melt adhesive with a thickness of 0.15 mm. The remaining face of the shrink film was wiped with TAPE PRIMER 94, and then one layer of PIB adhesive film prepared in PE1 was laminated to the shrink film. The resulting film was a laminate of hot melt adhesive, shrink film, and pressure sensitive adhesive with a total thickness of 0.25 mm. A sample of this laminate film was subjected to the shrinkage test with a result of 47% width and 117% length remaining after shrinking. Another piece of this film was cut to 4.5 cm long and 2.5 cm wide and wrapped around a stainless steel tube (15 cm long, 0.64 cm outside diameter) to make a tape coil with 4.5 full wraps and an outside diameter of 0.86 cm. The compliance of the tape (i.e., polymeric structure) made it easier to wrap compared to E12, and it did not tend to elastically unwind if pressure was removed from the coil. This tape coil was slid along the tube into an opening (0.89 cm diameter) within a galvanized steel sheet (20 cm×20 cm×0.09 cm). The tape of the wrapped tube was heated with a heat gun set at 260° C. for 120 seconds to form an assembly. The tape coil shrank in width to 1.4 cm and the wrapped tube increased in outer diameter to an average of 1.1 cm. Upon leak testing, the leak rate was 0.0005 mL/s, or 0.002 mL·s$^{-1}$·cm$^2$.

Example 13 (E13)

A piece of ST 2 was split lengthwise and partially relaxed to form a tape (i.e., polymeric structure) approximately 2.0 cm wide and 0.25 mm thick as described in E4. A piece of this tape (6.4 cm×1.9 cm×0.25 mm) was wrapped around a stainless steel tube (17 cm long, 0.64 cm outside diameter) with 2.75 full wraps and an outside diameter of 0.76 cm. The compliance of the tape made it easy to wrap and tended not to elastically unwind if pressure was removed from the coil. This tape coil was inserted into an opening (0.79 cm diameter) within a galvanized steel sheet (20 cm×20 cm×0.09 cm). The tape of the wrapped tube was heated with a heat gun set at 260° C. for 90 seconds to form an assembly. The tape coil shrank in width to 1.0 cm and the wrapped tube increased in outer diameter to an average of 0.94 cm. Upon leak testing, the leak rate was 0.08 mL/s, or 0.5 mL·s$^{-1}$·cm$^{-2}$.

Comparative Example B (CE B)

The tape (i.e., polymeric structure) from E13 was placed on piece of liner L2 in a 120° C. oven for five minutes to relax substantially all of the tape's orientation. The resulting tape was approximately 0.8 cm wide and 0.67 mm thick. A piece of this tape (2.2 cm long) was wrapped around a stainless steel tube (17 cm long, 0.64 cm outside diameter) with 1.0 full wraps and an outside diameter of 0.76 cm. This tape coil was inserted into an opening (0.79 cm diameter) within a galvanized steel sheet (20 cm×20 cm×0.09 cm). The tape of the wrapped tube was heated with a heat gun set at 260° C. for 90 seconds to form an assembly. The tape coil retained its original dimension of 0.76 cm in diameter and the wrapped tube 0.8 cm in width. The assembly was subjected to leak testing, but the method had to be modified by supporting the tube with a clamp because the tape alone did not provide enough support to hold the tube within the opening. The leak rate was 13 mL/s, or 77 mL·s$^{-1}$·cm$^{-2}$.

While the specification has described in detail certain exemplary embodiments, it will be appreciated that those skilled in the art, upon attaining an understanding of the foregoing, may readily conceive of alterations to, variations of, and equivalents to these embodiments. Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. A method comprising:
   a. providing a polymeric structure comprising a length, a width and a thickness, wherein the length of the polymeric structure is greater than the width of the polymeric structure, wherein the polymeric structure comprises a crosslinked polymeric layer uniaxially oriented in the width direction at a draw ratio of at least 1.2:1;
   b. wrapping the polymeric structure around a first substrate at least two full circuits;
   c. positioning the polymeric structure at least partially into an aperture defined by a second substrate; and
   d. subjecting the polymeric structure to an elevated temperature above the transition temperature of the crosslinked polymeric layer and below the degradation temperature of the crosslinked polymeric layer and any other components present in the polymeric structure, thereby increasing the thickness of the polymeric structure and creating at least a partial joint between the first substrate and the second substrate.

2. The method of claim 1 wherein the polymeric structure further comprises a first adhesive layer adjacent to a first major surface of the crosslinked polymeric layer.

3. The method of claim 2 wherein the polymeric structure further comprises a second adhesive layer adjacent to a second major surface of the crosslinked polymeric layer.

4. The method of claim 2 wherein the first adhesive layer comprises a hot melt adhesive.

5. The method of claim 3 wherein the second adhesive layer comprises a pressure sensitive adhesive.

6. The method of claim 1 wherein the positioning comprises sliding the polymeric structure a distance of at least a quarter of the width of the polymeric structure into the aperture defined by the second substrate.

7. The method of claim 1 wherein the width of the polymeric structure decreases by between 10% and 80% when subjected to the elevated temperature.

8. The method of claim 7 wherein the width of the polymeric structure decreases by between 20% and 50% when subjected to the elevated temperature.

9. The method of claim 1 wherein the polymeric structure contacts the second substrate such that water applied to the joint between the first substrate and the second substrate at a pressure of 6000 Pascals (Pa) passes between the polymeric structure and the second substrate at a rate of 4 milliliters per second (mL/s) or less, or 3 milliliters per second per square centimeter (mL·s$^{-1}$·cm$^{-2}$) or less.

10. The method of claim 1 wherein the first substrate comprises a pipe, a cable, a tube, a rod, a wire, or a bundle of one or more of combinations thereof.

11. The method of claim 1 wherein the polymeric structure is heated to a temperature of 60 to 150 degrees Celsius.

12. The method of claim 1 wherein the first substrate comprises no accessible end.

13. An article comprising a first substrate and a polymeric structure wrapped around the first substrate at least two full circuits, the polymeric structure having a length, a width and a thickness and comprising a crosslinked polymeric layer uniaxially oriented in the width direction at a draw ratio of at least 1.2:1, wherein the length of the polymeric structure is greater than the width of the polymeric structure.

14. The article of claim 13 wherein the polymeric structure further comprises a first adhesive layer adjacent to a first major surface of the crosslinked polymeric layer.

15. The article of claim 14 wherein the polymeric structure further comprises a second adhesive layer adjacent to a second major surface of the crosslinked polymeric layer.

16. The article of claim 15 wherein the crosslinked polymeric layer is oriented in the width direction at a draw ratio of 1.2:1 to 4:1.

17. The article of claim 13 wherein the crosslinked polymeric layer shrinks in the width direction by between 10% and 80% upon subjection to temperature above the transition temperature of the crosslinked polymeric layer and below the degradation temperature of the crosslinked polymeric layer and any other components present in the polymeric structure.

18. The article of claim 17 wherein the crosslinked polymeric layer shrinks in the width direction by between 20% and 50% upon subjection to temperature above the transition temperature of the crosslinked polymeric layer and below the degradation temperature of the crosslinked polymeric layer and any other components present in the polymeric structure.

19. The article of claim 13, wherein the first substrate includes a pipe, a cable, a tube, a rod, a wire, or a bundle of one or more of combinations thereof.

* * * * *

UNITED STATES PATENT AND TRADEMARK OFFICE
CERTIFICATE OF CORRECTION

PATENT NO. : 10,030,791 B2
APPLICATION NO. : 14/783592
DATED : July 24, 2018
INVENTOR(S) : Joseph Rule It is certified that error appears in the above-identified patent and that said Letters Patent is hereby corrected as shown below:

In the Specification

Column 25,
Line 13, delete ".$cm^2$." and insert -- .$cm^{-2}$. --, therefor.
Line 65, delete "lN" and insert -- kN --, therefor.

Column 26,
Line 23, delete ".$cm^2$." and insert -- .$cm^{-2}$. --, therefor.

Signed and Sealed this
Fourth Day of September, 2018

Andrei Iancu
*Director of the United States Patent and Trademark Office*